United States Patent
Song

(10) Patent No.: US 6,424,635 B1
(45) Date of Patent: Jul. 23, 2002

(54) ADAPTIVE NONLINEAR PROCESSOR FOR ECHO CANCELLATION

(75) Inventor: Wei-jei Song, Aliso Viejo, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/190,377

(22) Filed: Nov. 10, 1998

(51) Int. Cl.$^7$ .................................................. H04B 3/20
(52) U.S. Cl. ................................. 370/286; 379/406.01
(58) Field of Search ............................... 370/286, 287, 370/288, 289, 290, 333; 379/406.01, 406.05, 406.06, 410, 416

(56) References Cited

U.S. PATENT DOCUMENTS

| | | | | |
|---|---|---|---|---|
| 4,064,379 A | * | 12/1977 | Horna | 179/411 |
| 4,679,230 A | * | 7/1987 | Lassaux et al. | 379/411 |
| 4,751,730 A | * | 6/1988 | Galand et al. | 379/410 |
| 4,912,758 A | * | 3/1990 | Arbel | 379/388 |
| 4,965,822 A | * | 10/1990 | Williams | 379/390 |
| 4,991,166 A | * | 2/1991 | Julstrom | 370/288 |
| 4,998,241 A | * | 3/1991 | Brox et al. | 370/288 |
| 5,274,705 A | * | 12/1993 | Younce et al. | 370/289 |
| 5,351,291 A | * | 9/1994 | Menez et al. | 379/410 |
| 5,535,194 A | * | 7/1996 | Ashley et al. | 370/289 |
| 5,668,865 A | * | 9/1997 | Duttweiler et al. | 379/410 |
| 5,687,229 A | * | 11/1997 | Sih | 379/410 |
| 5,809,085 A | * | 9/1998 | Goodson et al. | 375/320 |
| 6,061,651 A | * | 5/2000 | Nguyen | 704/233 |

* cited by examiner

Primary Examiner—Dang Ton
Assistant Examiner—Brian Nguyen
(74) Attorney, Agent, or Firm—Blakely Sokoloff Taylor & Zafman LLP

(57) ABSTRACT

An echo canceler including a processor to adjust a dynamic clipping amplitude threshold for use in determining whether or not to clip outgoing audio. The dynamic clipping amplitude threshold is increased when the ratio of residue echo over echo is decreased over a prescribed period of time. The residue echo is taken as a difference between a true echo and an estimated echo initially emulated by the echo canceler. Likewise, when this ratio is increased over the prescribed period of time, the dynamic clipping amplitude threshold is decreased.

28 Claims, 6 Drawing Sheets

ADAPTIVE NONLINEAR PROCESSOR FOR ECHO CANCELLATION

BACKGROUND

1. Field

The present invention relates to the field of communications. In particular, this invention relates to a system and method for enhancing the quality of audio transferred over a network.

2. General Background

For many years, networks have been used to transfer voice data between a source and a destination. As shown in FIG. 1, a typical voice-based network 100 comprises a local (near-end) telephone 110 and a remote (far-end) telephone 120 coupled together over a bidirectional transmission path featuring a two-wire "local loop" line 130 in communication with a long-distance (four-wire) "trunk" line 131 of network 100. The trunk line 131 includes a pair of separated two-wire lines to transmit information to and receive information from remote telephone 120.

In particular, before reaching local telephone 110, an incoming voice data is provided to a hybrid circuit 140 in a local terminal 150. A "local terminal" is equipment maintained by a telephone company to route voice data to a telephone in a predetermined area. Hybrid circuit 140 is a transformer circuit that enables the voice data to be transmitted over different types of transmission lines. For example, hybrid circuit 140 may be designed to act as an interface between local loop line 130 (e.g., twisted pair) and trunk line 131 (e.g., fiber optics, microwave or any digital transport medium). Since hybrid circuit 140 is not perfectly terminated, a talker echo will occur.

"Talker echo" is generally defined as a particular amount of energy associated with incoming voice data that is reflected back to the caller from which the voice data originated. Typically, for voice-based networks, talker echo is experienced when a person speaking on the telephone can hear his or her own spoken words after a short delay. To mitigate talker echo, an echo canceler 160 is coupled to input and output transmission lines of trunk line 131.

As further shown in FIG. 1, echo canceler 160 is a circuit that observes, but does not modify, an incoming voice data before transmission to local telephone 110. Instead, echo canceler 160 performs an echo cancellation technique which includes the following: (1) estimating an amount of talker echo returning to the caller, (2) simulating the estimated echo, and (3) subtracting the estimate echo from outgoing voice data. Then, in most cases, a nonlinear processor (NLP) 161 of echo canceler 160 performs a center clipping transfer function to remove any echo residue as shown in FIG. 2. The removal of the echo residue is accomplished by clipping a portion of the outgoing voice data if it falls below selected clipping amplitude threshold levels A1 205 and −A1 210. These levels are measured in decibels such as decibel power levels (dBm0) for example. The clipped portion of the outgoing voice data is substituted for comfort noise that emulates a background noise level in order to avoid perceivable, audible artifacts.

One problem with the above-described echo cancellation technique is that the conventional NLP analyzes numerous parameters to determine the clipping amplitude threshold. In many cases, these parameters vary substantially over a short time duration that, in some situations, causes clipping errors to occur. For example, presume that NLP uses the amplitude level of far-end incoming voice data to calculate (i) the clipping amplitude threshold and (ii) whether a double talk condition exists (e.g., the two callers are talking simultaneously). If both callers are talking at substantially different amplitude ranges (e.g., the voice level of the far-end caller is approximately 10 or more decibels "dBs" higher than the voice level of the near-end caller), the outgoing voice data may be accidentally clipped.

Hence, it would be desirable to provide a system and method that minimizes the complexity of the NLP and enhances the quality of all audio by reducing the likelihood of erroneous clipping of the audio. This is accomplished through dynamic adjustment of the clipping amplitude threshold.

SUMMARY OF THE INVENTION

In one embodiment, the present invention relates to an echo canceler comprising a nonlinear processor utilizing a dynamic clipping amplitude threshold to determine whether or not to clip outgoing digital signals. The dynamic clipping amplitude threshold is increased when the ratio between the residue echo and echo is decreased over a prescribed period of time. In one embodiment, the residue echo is taken as a difference between a true echo and an estimated echo initially emulated by the echo canceler. This mitigates the tendency of erroneous clipping of the digital signals. Likewise, when the ratio is increased over the prescribed period of time, the dynamic clipping amplitude threshold is decreased.

BRIEF DESCRIPTION OF THE DRAWINGS

The features and advantages of the present invention will become apparent from the following detailed description of the present invention in which.

DETAILED DESCRIPTION OF AN EMBODIMENT

Herein, embodiments of the present invention relate to a system and method for enhancing the quality of audio transmitted over a network by mitigating the likelihood of erroneous clipping of the audio. This is accomplished by controlling the activation of the nonlinear processor associated with the echo canceler through dynamic adjustment of the clipping threshold amplitude.

Herein, certain terminology is used to describe various features of the present invention. In general, a "network" comprises one or more communication devices, coupled together through corresponding transmission lines. At least one of the communication devices includes the present invention. A "communication device" comprises a digital platform such as, for example, PASSPORT™ 4400 provided by MICOM Communications Corporation of Simi Valley, Calif., a Northern Telecom Company. Such a digital platform usually comprises software and/or hardware to perform analog to linear conversion, echo cancellation, and the like. A "transmission line" includes any communication link capable of transmitting digital information at some ascertainable bandwidth. Examples of a transmission line include a variety of mediums such as T1/E1, frame relay, private leased line, satellite, microwave, fiber optic, cable, asynchronous transfer mode (ATM), wireless communications (e.g., radio frequency "RF") or even a logical link.

As further described in the detailed description, audio includes voice signals, music or any other audible sound. An "echo canceler" is a circuit that performs echo cancellation on returning outgoing digital signals to eliminate echo such as talker echo, acoustic echo and the like. In this embodiment, the echo canceler includes a processor configured with executable software to perform echo cancellation. However, it is contemplated that the echo canceler may include dedicated circuitry that collectively performs echo cancellation.

Figure 1:
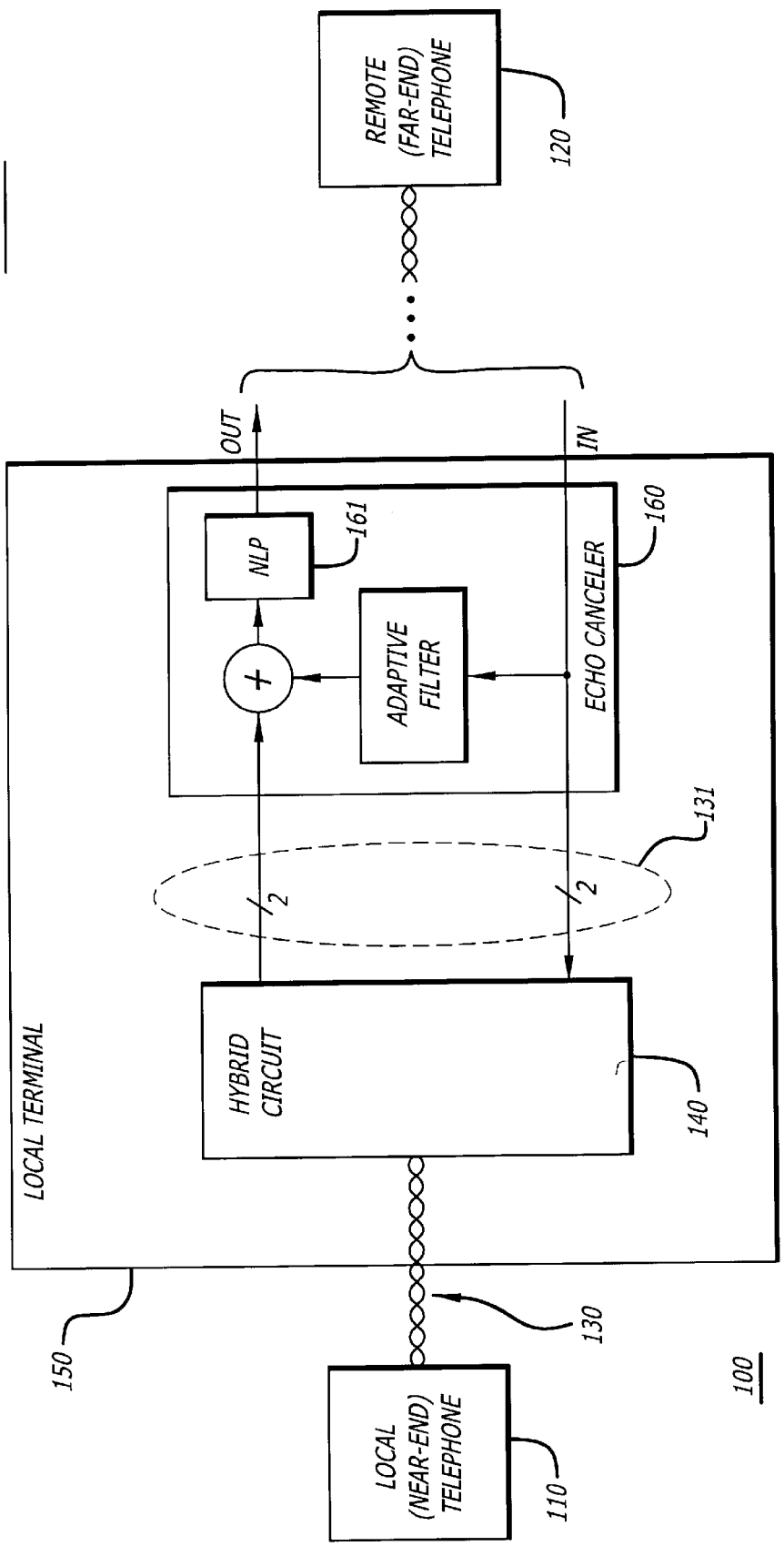
FIG. 1 is a conventional network including an echo canceler.
Figure 2:
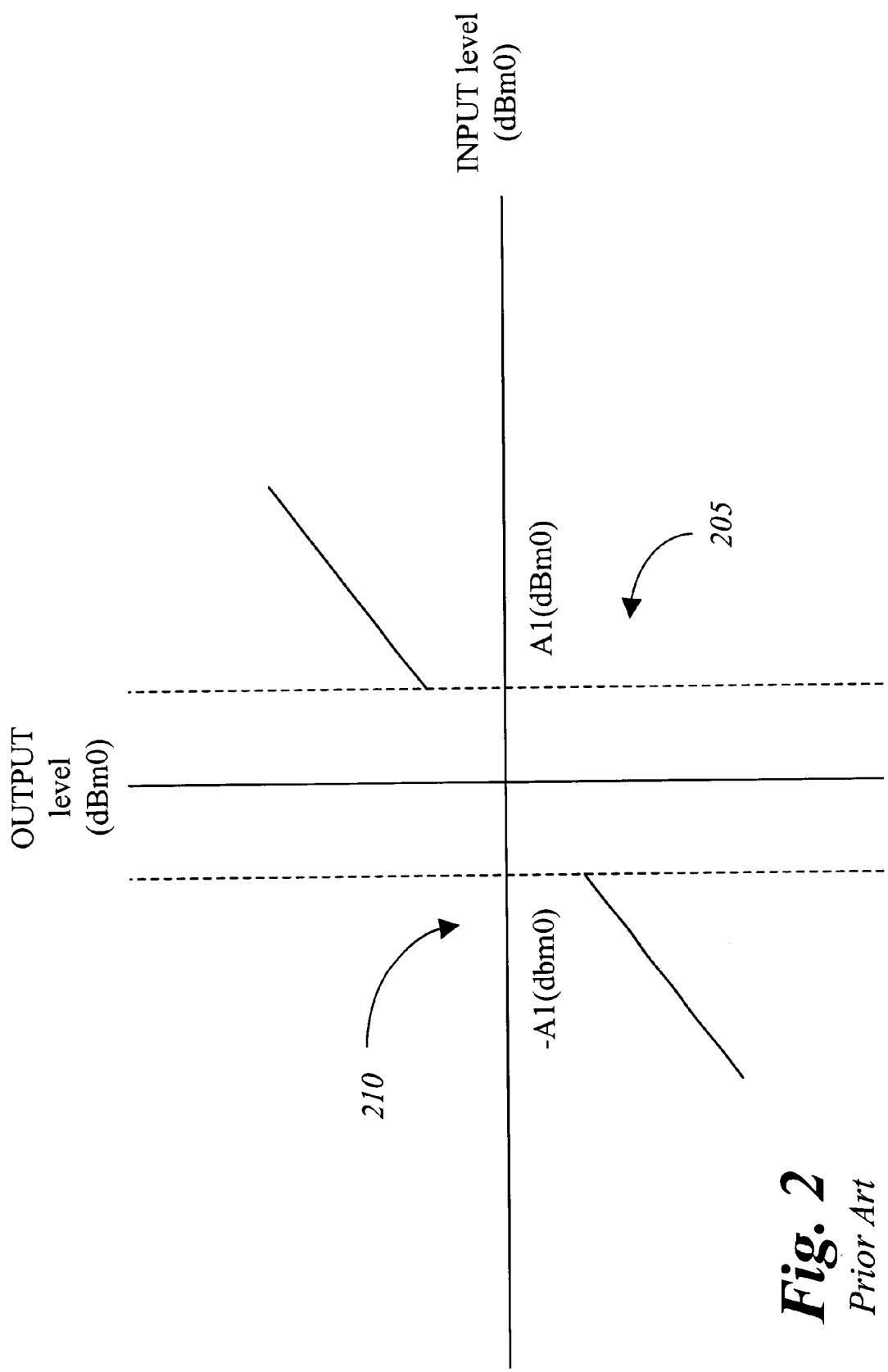
FIG. 2 is a center clipping function usually performed by standard echo cancelers.
Figure 3:
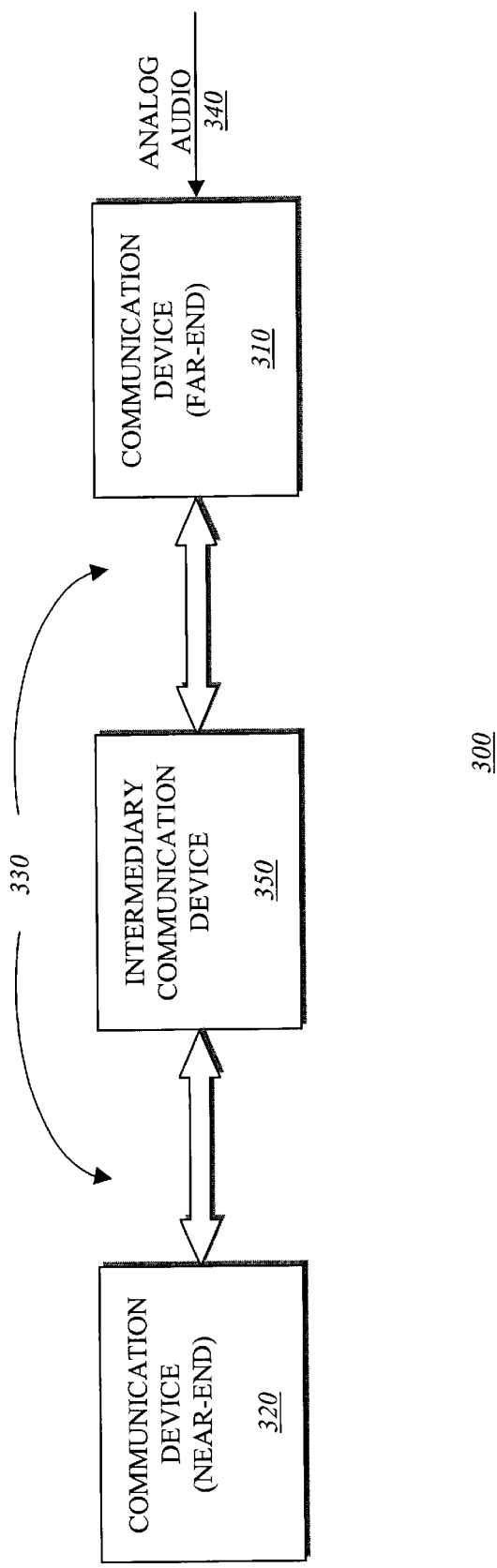
FIG. 3 is an illustrative block diagram of a network comprising an electronic platform including a digital signal processor.

Referring to FIG. 3, an illustrative embodiment of a network utilizing the present invention is shown. Herein, network 300 includes a communication device (far-end) 310 coupled to a second communication device (near-end) 320 via multiple transmission lines 330. Herein, far-end communication device 310 receives analog audio 340 as input. The audio is digitized and is transferred through network 300 until received by an intermediary communication device 350. It is contemplated that the audio may be digitized through one or more well-known techniques such as pulse code modulation, time-division muliplexing, frequency-division multiplexing, or other current or later developed techniques.

Intermediary communication device 350 analyzes the echo characteristics of a two-way digital signal, inclusive of the digital audio. Such analysis is performed in order to mitigate echo returned to far-end communication device 310 along with audio and/or comfort noise. Alternatively, it is contemplated that echo cancellation may be performed internally with any of the communication devices (e.g., devices 310 and/or 320) in lieu of intermediary communication device 350.

Figure 4:
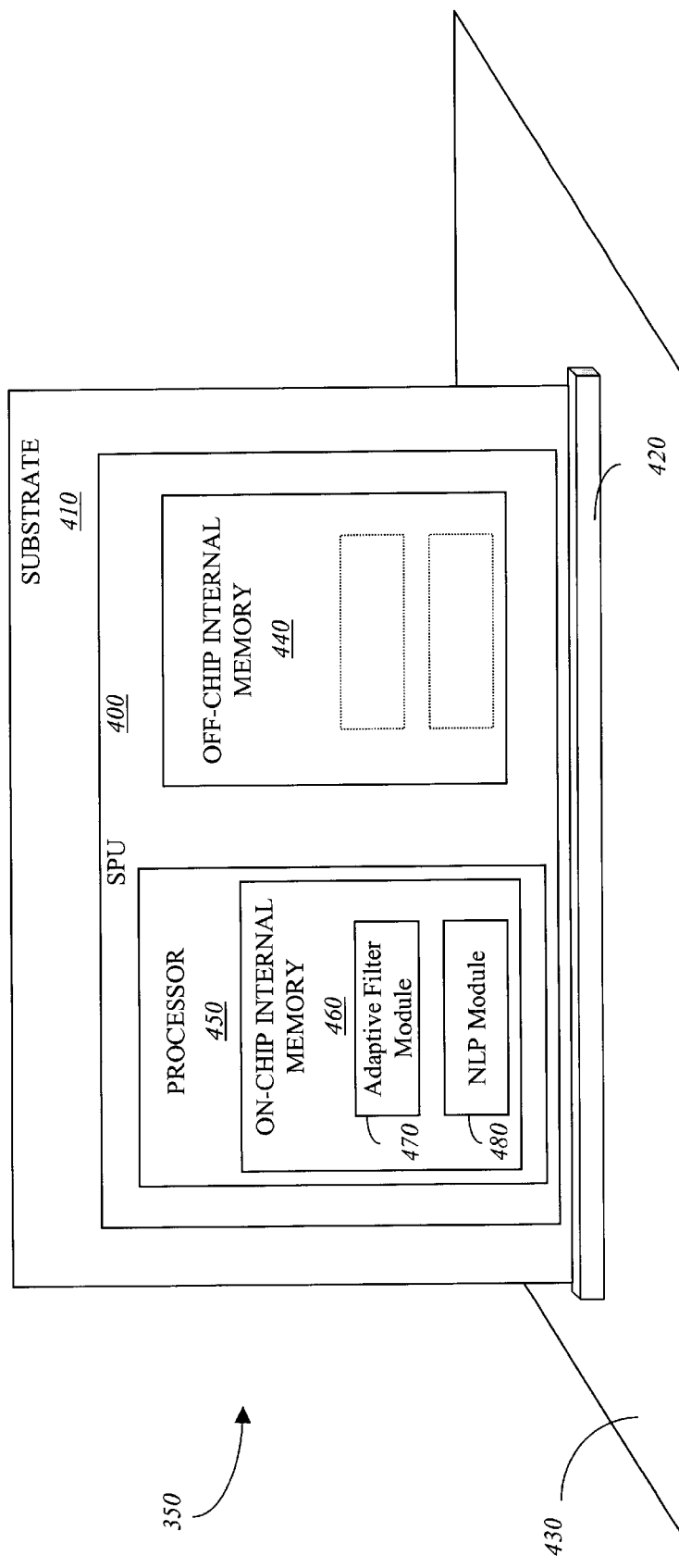
FIG. 4 is an illustrative block diagram of an embodiment of a signal processing unit including a nonlinear module to reduce residue echo.

Referring now to FIG. 4, intermediary communication device 350 (or alternatively device 310 and/or 320) comprises a signal processing unit (SPU) 400 coupled to a substrate 410. Substrate 410 is formed with any type of material or combination of materials upon which integrated circuit (IC) devices can be attached. In one embodiment, substrate 410 includes a daughter card coupled to a connector 420 of a motherboard 430 in order to exchange information with other logic mounted on motherboard 430. Any style for connector 420 may be used, including a standard female edge connector, a pin field connector, a socket, a network interface card (NIC) connection and the like. Of course, in lieu of the illustrated embodiment, substrate 410 may be a motherboard upon which signal processing unit 400 and other logic is attached.

As shown, signal processing unit 400 includes off-chip memory 440 and a processor 450. In this embodiment, processor 450 includes, but is not limited or restricted to a digital signal processor, a general purpose microprocessor, a microcontroller or any other logic having software processing capabilities. Processor 450 includes an on-chip internal memory 460 to store software for echo cancellation, and thus, acts as an echo canceler. This software includes an adaptive filter module 470 and nonlinear processor (NLP) module 480 as shown. Of course, for cost reduction, adaptive filter module 470 and/or NLP module 480 may be stored in off-chip memory 440 as represented by dashed lines. In this embodiment, memory 440 includes non-volatile memory, although volatile memory or a combination of both volatile and non-volatile memory may be used.

It is contemplated that other embodiments for echo cancelers may be implemented in lieu of a software-based processor implementation as described above. For example, the adaptive filter, summing circuit and nonlinear processor of the echo canceler may be programmable logic or even combinatorial logic.

Figure 5:
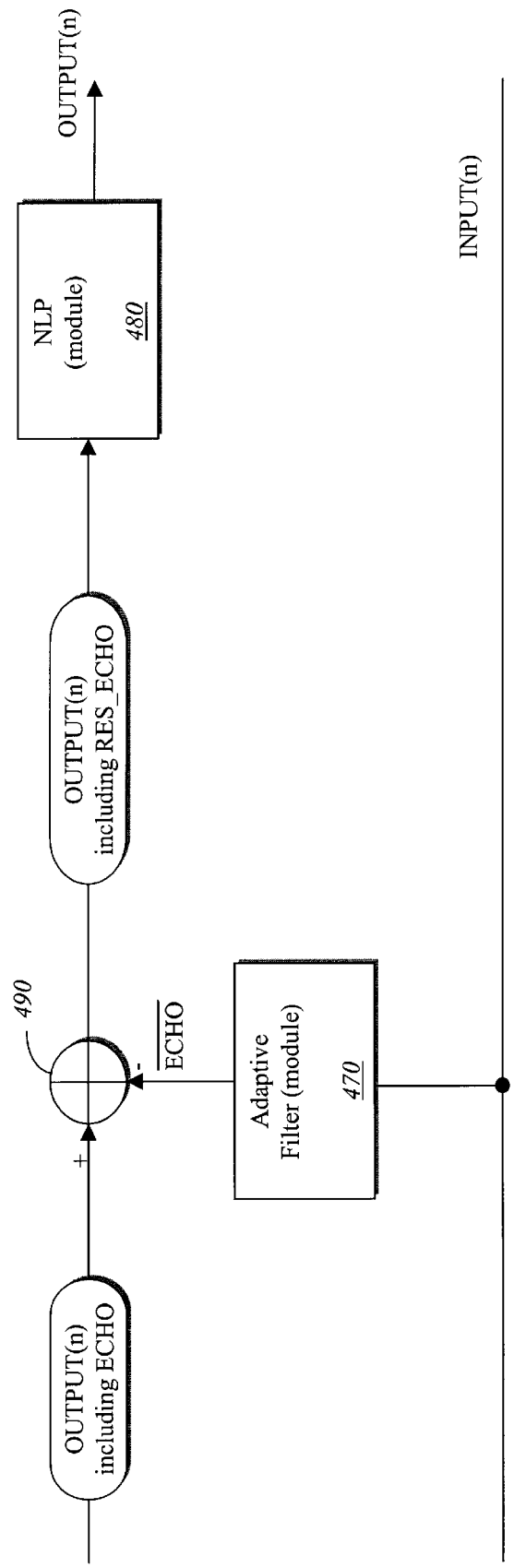
FIG. 5 is an illustrative block diagram of the adaptive filter and non-linear processor of the echo canceler of FIG. 4.

Referring now to FIG. 5, a block diagram of an embodiment featuring the operations of processor 450 (see FIG. 4) is shown. Based on the signal characteristics of an incoming digital signal (referred to as "INPUT(n)"), the processor executes an adaptive filter module 470 that produces an estimated echo ($\overline{ECHO}$) associated with INPUT(n) and subtracts the estimated echo from echo associated with an outgoing digital signal (referred to as "OUTPUT(n)") upon input into a summing circuit 490. Ideally, OUTPUT(n) now includes near-end audio and any locally generated noise. However, in most cases, OUTPUT(n) includes an echo residue (RES_ECHO); namely, echo that adaptive filter module 470 did not remove.

Previously, in conventional echo cancellation techniques, NLP module would remove RES_ECHO from OUTPUT(n) by clipping OUTPUT(n) signal at amplitudes below a preset, constant clipping amplitude threshold. In contrast with conventional echo cancellation techniques, NLP module 480 is configured so that the clipping amplitude threshold is dynamically adjusted based on the echo return loss enhancement (ERLE). ERLE may be calculated at a decibel power level (dB). Thus, the clipping amplitude threshold is defined in equation (1) as follows:

$$\text{Clipping Amplitude Threshold} = \text{Default}_{dBgm0} + ERLE_{dB} \quad (1)$$

In this embodiment, the "default" signal value is a minimum decibel power level that is clipped from each outgoing digital signal, regardless on the amount of echo and echo residue detected. For this embodiment, the default signal value is set to be approximately −55 dBm0, although other amplitude levels may be selected as the default. "ERLE" is equivalent to a ratio between (i) $ECHO_{ave}$ being the average amplitude level of "OUTPUT(n)" prior to execution of the adaptive filter module 470, and (ii) $RES\_ECHO_{ave}$ being the average amplitude level of "OUTPUT(n)" after the adaptive filter module 470 has been performed. ERLE (in dB) is calculated through either equation (2) or equation (3) as shown:

$$ERLE_{dB} 20 \log_{10}(ECHO_{ave}/RES\_ECHO_{ave}), \quad (2)$$

or $$ERLE_{dB} = ECHO_{ave(in\ dBm0)} - RES\_ECHO_{ave(in\ dBm0)} \quad (3)$$

Hence, the processor performing the echo cancellation using the NLP module 480 is able to detect when the echo canceler is converging (e.g., $RES\_ECHO_{ave}$ is decreasing with respect to $ECHO_{ave}$), and in response, adjusting the clipping amplitude threshold to a greater amplitude level. Thus, erroneous clipping of audio is avoided. Conversely, if the echo canceler is not converging or even diverging (e.g., $RES\_ECHO_{ave}$ remains at the same level as $ECHO_{ave}$ or increases to a greater amplitude level than $ECHO_{ave}$), ERLE decreases so that more conservative clipping is performed by the NLP module 480 and clipping will be turned off automatically with this decreased threshold.

Figure 6:
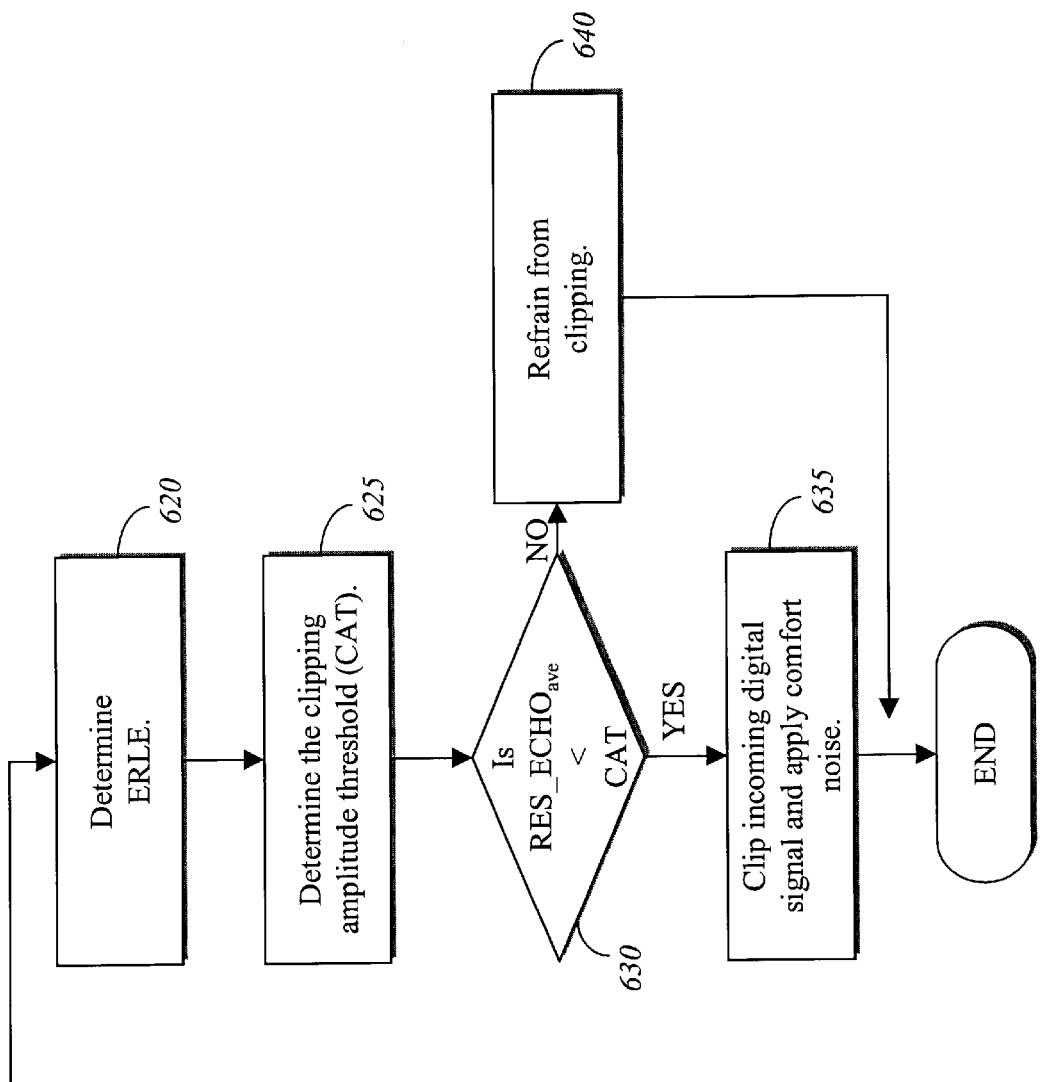
FIG. 6 is an illustrative flowchart of the operations of the nonlinear processor of the echo canceler of FIG. 2.

Referring to FIG. 6, an illustrative flowchart of an embodiment of the operations of the echo canceler is shown. As shown in block 600, when receiving INPUT(n), the echo canceler executes the adaptive filter module to estimate an amount of echo that will be returning over OUTPUT(n). This estimated echo is a based on INPUT(n). Thereafter, upon receiving OUTPUT(n), the amount of true echo associated with the outgoing digital signal is calculated (block 605).

After determining the estimated echo ($\overline{ECHO}$) and the true echo (ECHO) buried in OUTPUT(n), $\overline{ECHO}$ is subtracted from ECHO to produce a current residue echo (RES_ECHO) buried in outgoing OUTPUT(n) as shown in block 610. In block 615, the new average signal value of RES_ECHO is calculated from the following equation (4).

$$RES\_ECHO_{ave} = RES\_ECHO_{ave} + \beta \times |RES\_ECHO_{current}| \quad (4)$$

where $\beta = 0 < \beta < 1$;

Next, in blocks 620 and 625, ERLE is calculated in order to calculate the clipping amplitude threshold. It is contemplated that the clipping amplitude threshold may be stored as a parameter (NEW_THRESHOLD) and NEW_THRESHOLD is compared with a maximum threshold allowed. If NEW_THRESHOLD exceeds the maximum threshold, NEW_THRESHOLD is set to the maximum threshold. This is performed so that the echo canceler will not cancel beyond typical clipping amplitude thresholds (e.g., around −37 dBm0). As a result, strong background noise or background music (e.g., music-on-hold) will pass through the echo canceler.

Thereafter, the average signal value for RES_ECHO ($RES\_ECHO_{ave}$) is compared to the clipping amplitude threshold (block 630). If the $RES\_ECHO_{ave}$ does not exceed a clipping amplitude threshold, as defined in equations (1) and (2), the outgoing digital signal is clipped (see block 635). Otherwise, no clipping is performed by the nonlinear processor (block 640).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the present invention can apply to acoustic echo cancellation, where no hybrid circuit is provided and the local loop line is replaced with air.

What is claimed is:

1. A method of reducing a likelihood of erroneous clipping of outgoing audio by an echo canceler, the method comprising:
   producing a clipping amplitude threshold, the clipping amplitude threshold being dynamically adjusted based on an echo return loss enhancement which based on a new average signal value of a residue echo, the new average signal value of the residue echo being the ones complement of a number between zero and one times an average signal value of the residue echo plus a current absolute value of residue echo times the number; and
   increasing the dynamic clipping amplitude threshold when an echo return loss enhancement signal value is increasing over a period of time.

2. The method of claim 1, wherein prior to increasing the dynamic clipping amplitude threshold, the method comprising:
   comparing the dynamic clipping amplitude threshold to a predetermined maximum clipping amplitude threshold; and
   setting the dynamic clipping amplitude threshold to the maximum clipping amplitude threshold if the dynamic clipping amplitude threshold is greater than the maximum clipping amplitude threshold.

3. The method of claim 2, wherein prior to producing the dynamic clipping amplitude threshold, the method comprising:
   determining the average signal value of the residue echo.

4. The method of claim 3 further comprising:
   comparing the average signal value of the residue echo to the dynamic clipping amplitude threshold; and
   clipping the outgoing audio if the average signal value of the residue echo exceeds the dynamic clipping amplitude threshold.

5. The method of claim 4 further comprising:
   refraining from clipping the outgoing audio if the average signal value of the residue echo is less than the dynamic clipping amplitude threshold.

6. The method of claim 1 further comprising:
   decreasing the dynamic clipping amplitude threshold when the echo return loss enhancement signal value is decreasing over the period of time.

7. A method of reducing a likelihood of erroneous clipping of outgoing audio by an echo canceler, the method comprising:
   producing a clipping amplitude threshold, the clipping amplitude threshold being dynamically adjusted based on an echo return loss enhancement which based on a new average signal value of a residue echo, the new average signal value of the residue echo being the ones complement of a number between zero and one times an average signal value of the residue echo plus a current absolute value of residue echo times the number;
   increasing the dynamic clipping amplitude threshold when an echo return loss enhancement signal value is increasing over a period of time wherein producing of the clipping amplitude comprises:
     determining a minimum amplitude level assigned for clipping the outgoing audio;
     determining the echo return loss enhancement signal value; and
     adding the echo return loss enhancement signal value to the minimum amplitude level to produce the dynamic clipping amplitude threshold.

8. The method of claim 7, wherein the determination of the echo return loss enhancement signal value comprises:
   determining an estimated echo for incoming audio;
   determining a true echo for the outgoing audio;
   subtracting the estimated echo from the true echo to produce the residue echo; and
   clipping the residue echo falling below the dynamic clipping amplitude threshold.

9. The method of claim 8, wherein each of the true echo, the estimate echo and the residue echo is based on a decibel power level.

10. The method of claim 7, wherein the determination of the echo return loss enhancement signal value comprises:
    determining an estimated echo for incoming audio;

determining a true echo for the outgoing audio;

subtracting the estimated echo from the true echo to produce the residue echo;

producing a ratio between the true echo and the residue echo;

applying a logarithmic function to the ratio to produce a result; and multiplying the result by a predetermined multiplier.

11. A communication device comprising:

a substrate;

a processor placed on the substrate; and a memory coupled to the processor, the memory to contain a nonlinear processor module which, when executed by the processor, produces an amplitude threshold in order to reduce erroneous clipping of digitized audio as an echo return loss enhancement (ERLE) signal value associated with a digitized audio various over time, the clipping amplitude threshold being dynamically adjusted based on the ERLE signal value which based on a new average signal value of a residue echo, the new average signal value of the residue echo being the ones complement of a number between zero and one times an average signal value of the residue echo plus a current absolute value of residue echo times the number.

12. The communication device of claim 11, wherein the nonlinear processor module, when executed by the processor, controls the processor to decrease the clipping amplitude threshold when the echo return loss enhancement signal value is decreasing over a prescribed period of time.

13. The communication device of claim 11, wherein the nonlinear processor module, when executed by the processor, controls the processor to determine both a minimum amplitude level for the clipping digitized audio and the echo return loss enhancement signal value, and to add the echo return loss enhancement signal value to the minimum amplitude level to produce the adjustable clipping amplitude threshold.

14. The communication device of claim 13, wherein the processor determines the echo return loss enhancement signal value by determining an estimated echo for incoming digital audio, determining a true echo for the outgoing digital audio, subtracting the estimated echo from the true echo to produce the residue echo, and clipping the residue echo.

15. The communication device of claim 14, wherein the processor clips a portion of the residue echo falling below the clipping amplitude threshold.

16. The communication device of claim 11, wherein the memory includes an on-chip non-volatile memory associated with the processor.

17. The communication device of claim 11, wherein the memory includes an off-chip non-volatile memory physically separate from the processor.

18. A communication device comprising:

a substrate;

a processor placed on the substrate; and a memory coupled to the processor, the memory to contain a nonlinear processor module which, when executed by the processor, produces an amplitude threshold in order to reduce erroneous clipping of digitized audio as an echo return loss enhancement (ERLE) signal value associated with a digitized audio various over time, the clipping amplitude threshold being dynamically adjusted based on the ERLE signal value which based on a new average signal value of a residue echo, the new average signal value of the residue echo being the ones complement of a number between zero and one times an average signal value of the residue echo plus a current absolute value of residue echo times the number wherein the nonlinear processor module, when executed by the processor controls the processor to decrease the clipping amplitude threshold when the echo return loss enhancement signal value is decreasing over a prescribed period of time.

19. A machine readable medium having embodied thereon a computer program for processing by a machine, the computer program comprising:

a first routine for determining an echo return loss enhancement signal value; and a second routine for applying the echo return loss enhancement signal value to a clipping amplitude threshold for use in removing residue echo from digital signals to be output from the machine, the clipping amplitude threshold being dynamically adjusted based on an echo return loss enhancement which based on a new average signal value of a residue echo, the new average signal value of the residue echo being the ones complement of a number between zero and one times an average signal value of the residue echo plus a current absolute value of residue echo times the number.

20. The machine readable medium of claim 19, wherein the computer program further comprising:

a third routine for increasing the clipping amplitude threshold when the echo return loss enhancement signal value is increasing over a prescribed period of time.

21. The machine readable medium of claim 20, wherein the computer program further comprising:

a fourth routine for decreasing the clipping amplitude threshold when the echo return loss enhancement signal value is decreasing over the prescribed period of time.

22. The machine readable medium of claim 19, wherein the computer program further controlling the clipping of digital signals including audio.

23. The machine readable medium of claim 22, wherein the first routine of the computer program further comprising:

a first subroutine for determining an estimated echo for audio input into the machine;

a second subroutine for determining a true echo associated with the audio;

a third subroutine for subtracting the estimated echo from a time echo to produce the residue echo; and a fourth subroutine for clipping the residue echo.

24. A machine readable medium having embodied thereon a computer program for processing by a machine, the computer program comprising:

a first routine for determining an echo return loss enhancement signal value; and a second routine for applying the echo return loss enhancement signal value to a clipping amplitude threshold for use in removing residue echo from digital signals to be output from the machine, the clipping amplitude threshold being dynamically adjusted based on an echo return loss enhancement which based on a new average signal value of a residue echo, the new average signal value of the residue echo being the ones complement of a number between zero and one times an average signal value of the residue echo plus a current absolute value of residue echo times the number wherein the machine includes a processor operating as an echo canceler using the nonlinear processor module.

25. An echo canceler comprising:

an adaptive filter to produce an average amplitude level of an estimated echo associated with incoming digital signals;

a summing circuit coupled to the adaptive filter, the summing circuit to subtract the average amplitude level of the estimated echo from an average amplitude level of a true echo associated with outgoing digital signals; and a nonlinear processor coupled to the summing circuit, the nonlinear processor to clip the outgoing digital signals based on a clipping amplitude threshold, the clipping amplitude threshold being dynamically modified through adjustment of an echo return loss enhancement (ERLB) signal value which based on a new average signal value of a residue echo, the new average signal value of the residue echo being the ones complement of a number between zero and one times an average signal value of the residue echo plus a current absolute value of residue echo times the number.

26. An echo canceler comprising:

an adaptive filter to produce an average amplitude level of an estimated echo associated with incoming digital signals;

a summing circuit coupled to the adaptive filter, the summing circuit to subtract the average amplitude level of the estimated echo from an average amplitude level of a true echo associated with outgoing digital signals; and a nonlinear processor coupled to the summing circuit, the nonlinear processor to clip the outgoing digital signals based on a clipping amplitude threshold, the clipping amplitude threshold being dynamically modified through adjustment of an echo return loss enhancement (ERLE) signal value which based on a new average signal value of a residue echo, the new average signal value of the residue echo being the ones complement of a number between zero and one times an average signal value of the residue echo plus a current absolute value of residue echo times the number further comprising circuitry to determine the average amplitude level of the true echo associated with the outgoing digital signals prior to being input into the summing circuit.

27. The echo canceler of claim 26, wherein the nonlinear processor comprises:

circuitry to determine the average amplitude level of residue echo for the outgoing digital signals after the summing circuit has subtracted the average amplitude level of the true echo from the average amplitude level echo of the estimated echo; and circuitry to determine the ERLE signal value for the outgoing digital signals; and circuitry to clip the outgoing digital signals based on the clipping amplitude threshold adjusted in response to the ERLE signal value.

28. A communication device comprising:

means for storing software which, when executed, produces an adjustable clipping amplitude threshold for reduction of erroneous clipping of digitized audio, the clipping amplitude threshold being dynamically adjusted, the software including a nonlinear processor module; and means for processing the software to alter the clipping amplitude threshold based on an echo return loss enhancement (ERLE) signal value associated with the digitized audio, the means for processing to increase the clipping amplitude threshold in response to an increase in the ERLE signal value and to decrease the clipping amplitude threshold in response to a decrease in the ERLE signal value which based on a new average signal value of a residue echo, the new average signal value of the residue echo being an average signal value of the residue echo and a current absolute residue echo multiplying a number between 0 and 1.

* * * * *

UNITED STATES PATENT AND TRADEMARK OFFICE
CERTIFICATE OF CORRECTION

PATENT NO.    : 6,424,635 B1
DATED         : July 23, 2002
INVENTOR(S)   : Song

It is certified that error appears in the above-identified patent and that said Letters Patent is hereby corrected as shown below:

Column 9,
Line 17, please delete "ERLB" and insert -- ERLE --.

Signed and Sealed this

Fifteenth Day of June, 2004

JON W. DUDAS
*Acting Director of the United States Patent and Trademark Office*